United States Patent [19]

Nusbaum

[11] Patent Number: 5,305,936
[45] Date of Patent: Apr. 26, 1994

[54] COMBINATION BICYCLE/SKI CARRIER FOR AUTOMOBILES

[76] Inventor: Neil Nusbaum, 11170 Westwood Boulevard, Culver City, Calif. 90230

[21] Appl. No.: 937,356

[22] Filed: Aug. 27, 1992

[51] Int. Cl.⁵ .................................................. B60R 9/00
[52] U.S. Cl. ...................................... 224/324; 224/282; 224/42.03 B; 224/42.45 R; 224/917; 211/17; 211/70.5
[58] Field of Search ............. 224/282, 30 R, 31, 32 R, 224/33 R, 39, 42.03 R, 42.03 B, 309, 314, 324, 329, 42.45 R, 917; 211/70.5, 17, 18

[56] References Cited

U.S. PATENT DOCUMENTS

| | | | |
|---|---|---|---|
| 2,574,250 | 11/1951 | Dalton | 224/42.45 R |
| 4,089,448 | 5/1978 | Traeger | 224/42.03 B |
| 4,452,385 | 6/1984 | Prosen | 224/329 X |
| 4,856,686 | 8/1989 | Workentine | 224/42.03 B |
| 4,997,116 | 3/1991 | Grim | 224/329 X |
| 5,096,102 | 3/1992 | Tolson | 224/917 X |

*Primary Examiner*—Glenn T. Barrett
*Attorney, Agent, or Firm*—Natan Epstein

[57] ABSTRACT

A combination bicycle/ski carrier has a carrier frame attachable to an automobile, supports for one or more cycles, and ski carriers which are retractable when not in use to avoid damage to cycles on the carrier.

20 Claims, 2 Drawing Sheets

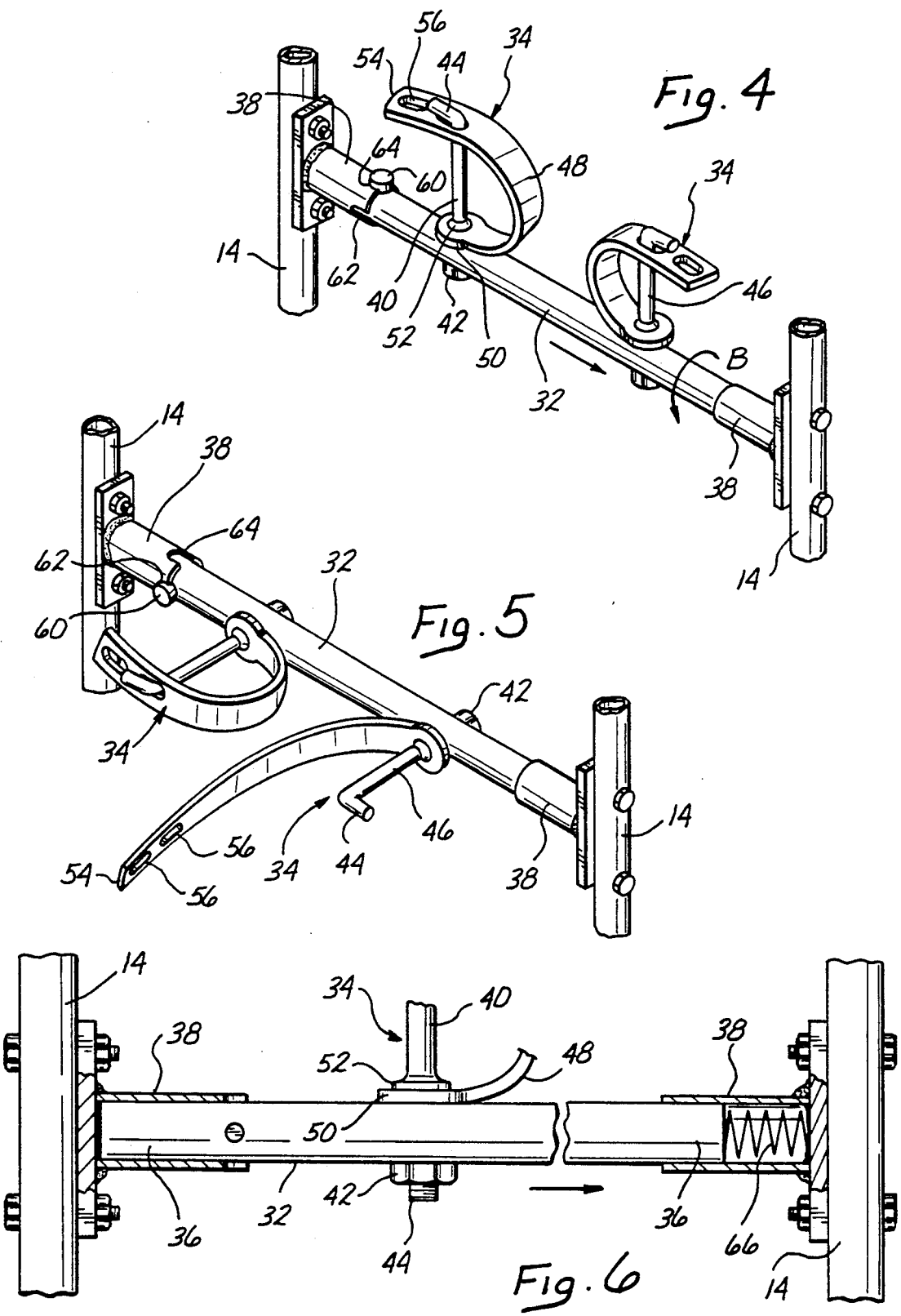

COMBINATION BICYCLE/SKI CARRIER FOR AUTOMOBILES

BACKGROUND OF THE INVENTION

1. Field of the Invention

The present invention relates to the field of racks and carriers for attachment to the exterior of automobiles and more particularly is directed to a combination carrier rack useful for carrying either bicycles or snow skis on an automotive vehicle equipped with the combination carrier.

2. State of the Prior Art

Carriers for mounting to the exterior of an automotive vehicle have long been in use for the transport of both bicycles and skis. Combination carriers for these two items are also known. One known type of bicycle rack has a tubular frame which is mounted over the bumper and on the rear of the trunk lid an automotive vehicle and attached to the vehicle by straps with hook elements at their ends. One pair of straps hooks under the bumper of the car, and a second pair of straps hooks to the forward edge of the trunk lid, within the gap normally found along the edge of the trunk lid. The length of the straps is adjustable to provide a snug and wobble free anchoring for the carrier on the automotive vehicle. The carrier frame primarily consists of two U-shaped frame elements. A first frame element lies against the surface of the automotive vehicle to which the frame is attached. A second frame element extends transversely to the first frame element and has two parallel support arms which extend rearwardly away from the vehicle. Bicycles to be transported are placed with the top tube of the bicycle frame on the support arms of the carrier, so that the bicycle rests on these arms. The bicycle is normally secured in place by additional retaining straps. The first frame element of the carrier frame lies between the bicycle and the vehicle to protect the vehicle surface against scraping by the bicycle.

It is known to provide such a bicycle carrier with attachments for carrying snow skis. In presently known combination carriers of this type, the ski attachments are mounted on cross bars which extend between parallel arms of the first U-shaped frame element of the carrier frame. The ski attachments extend in the direction of the bicycle supporting arms of the second frame element. As a result, the ski attachments tend to interfere with any bicycles supported on the carrier frame, and may potentially scratch or otherwise damage the bicycles. While combination bicycle/ski carriers offer the convenience and economy of dual-purpose year-around use of the carrier, the inconvenience and potential damage to bicycles by the ski attachments remains a shortcoming in such combination carriers.

Existing bicycle carriers are available with a bolt-on ski-carrier attachment which must be mounted on the bicycle carrier by the user when needed. The ski-carrier is mounted either with bolts which pass through holes in the bicycle carrier frame, or by means of clamps which are tightened around the frame. The ski-carrier attachment must be removed if the carrier is to be used for transporting bicyles, since the ski-carrier would interfere with the cycles. This process is inconvenient, and if the ski-carrier is carelessly or improperly mounted to the frame it may disengage during road travel, causing loss of the equipment and possible accident and injury.

What is needed is a combination bicycle/ski carrier with factory mounted ski-attachments, constructed to avoid damage to or inteference with bicycles on the carrier, thereby to eliminate the need for detaching the ski-carrier when a bicycle is to be transported.

SUMMARY OF THE INVENTION

The present invention addresses the aforementioned need by providing a combination bicycle/ski carrier for attachment to the exterior of an automotive vehicle, which carrier is provided with ski attachments which are movable between an extended position in which skis may be fastened to the carrier by the ski attachments, and a retracted position in which the ski attachments are moved away from potential interference and contact With bicycles supported on the carrier. The ski attachments are mounted on tubular cross bar supports which are mounted to the first carrier frame element for rotation about their longitudinal axis. Each cross bar has a detent for stopping rotation of the cross bar at the extended and retracted positions of the ski attachments.

In a presently preferred form of the invention, each cross bar has opposite ends which turn in corresponding sockets fixed to the first carrier frame element. The cross bar has a detent pin which fits into one of two circumferentially spaced axial slots in a socket at one end of the cross bar, while a spring captive in a second socket at the opposite end of the cross bar urges the detent pin into the slot. The cross bar is rotated from one to another of the two positions by pulling the cross bar and detent pin out of the slot against the force of the captive spring, and then turning the cross bar and fitting the detent into the other of the two slots.

Each ski attachment or ski carrier is made up of a rigid post fixed transversely to the cross bar and a flexible strap attached at one end to the cross bar, with an opposite end of the strap being releasably attachable to the post for retaining and securing skis between the strap and the post. Each pair of skis is secured by two ski attachments, one attachment on each of the two cross bars, so that the skis are held to the carrier frame at two spaced apart points along their length. In a typical combination carrier according to this invention, each cross bar is provided with two ski attachments, each attachment capable of retaining one pair of snow skis.

These and other advantages, features and improvements of the present invention will be better understood by reference to the following detailed description of the preferred embodiment and the accompanying drawings.

BRIEF DESCRIPTION OF THE DRAWINGS

FIG. 4 is a fragmentary perspective view of the rack of FIG. 1, showing two ski attachments on one of the rotatable cross bars of the carrier, the ski attachments being shown in their retracted position;

FIG. 5 is a view as in FIG. 4, with the cross bar turned 90 degrees to move the ski attachments to their operative extended position;

FIG. 6 is a fragmentary plan view of the carrier showing the mounting of the cross bar for rotation at its opposite ends and the detent mechanism for locking the cross bar at the extended and retracted positions of the ski attachments.

DETAILED DESCRIPTION OF THE PREFERRED EMBODIMENT

Figure 1:
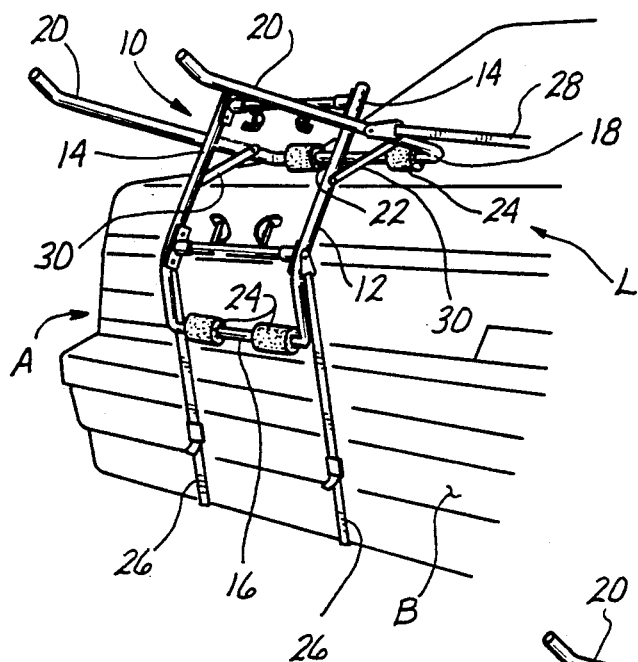
FIG. 1 is a perspective view of a combination bicycle/ski carrier mounted to the rear of a typical automobile.
Figure 2:
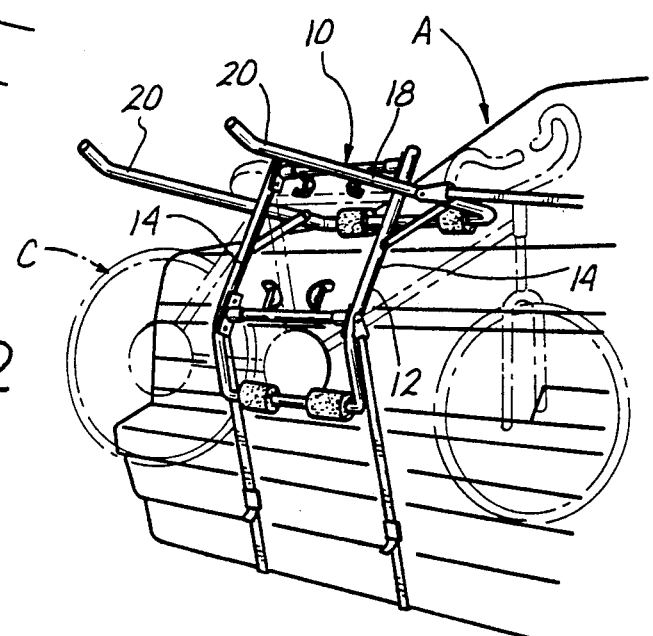
FIG. 2 shows the carrier of FIG. 1 with a bicycle supported thereon for transport by the automobile.

With reference to the drawings wherein like numerals indicate like elements, FIG. 1 shows the rear portion of a typical automobile A with a rear bumper B and a trunk lid L. The combination bicycle/ski rack of this invention is generally designated by the numeral 10, and includes a first U-shaped frame element 12 with two upwardly extending parallel arms 14 at a lower end of the frame 10. The upper ends of the two arms 14 are also the upper end of the frame 10. and a cross arm 16 joining the lower ends of the two arms 14. A second U-shaped frame element 18 has two parallel arms 20 connected at a front end by a cross bar 22. The two cross bars 16, 22 carry shock absorbing sleeves 24 which protect the surface finish of the vehicle A against scratching by the carrier 10. The carrier 10 is secured to the automobile as shown in FIG. 1 by two pairs of retraining straps, a lower pair of straps 26 which hooks to the underside of the bumper B, and an upper pair of straps 28, only one of which is shown in the drawing, which hooks to the front edge of the trunk lid L in a manner well known in the art. The two frame elements 12, 18 are connected together at the intersection of the arms 14 and 20 and are fixed at a particular angle relative to each other by linkages 30. A bicycle C shown in phantom lining in FIG. 2 is supported on the carrier 10 by resting the cross bar or top tube of the bicycle frame on the supporting arms 20 of the carrier 10. The bicycle frame then generally lies against the frame element 12 of the carrier, away from contact with the vehicle A. Additional straps and ties may be used to secure the bicycle C in place during road travel of the vehicle A.

Figure 3:
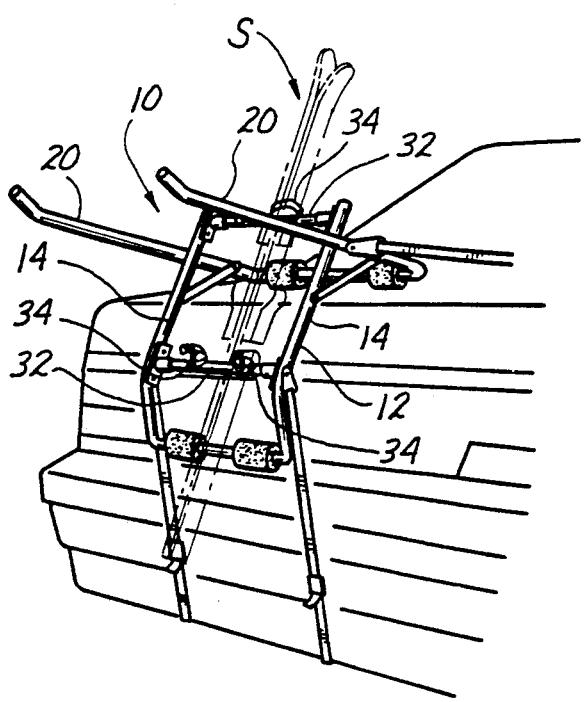
FIG. 3 shows the rack of FIG. 1 with a pair of snow skis fastened to the carrier for transport by the automobile.

The carrier 10 has two cross bars 32 mounted between the arms 14 of frame element 12. Each cross bar 32 has two ski attachments 34, and a pair of snow skis S joined bottom-to-bottom are retained to the carrier 10 by two spaced apart attachments 34, one attachment on each cross bar 32, as shown in FIG. 3. The two cross bars 32 are similar to each other in all respects, and are mounted in mutually parallel spaced apart relationship between the two parallel arms 14, as already described. The skis are supported parallel to the arms 14, and extending between the upper and lower ends of the frame 10.

The arrangement of the ski attachments 34 and cross bar 32 is better understood by reference to FIGS. 4 through 6. Each cross bar 32 is a straight tubular segment with opposite ends 36, seen in FIG. 6, fitted within cylindrical sockets 38 which are mounted on the parallel arms 14. The cross bar 32 is free to rotate about its longitudinal axis within the two sockets 38.

Each cross bar 32 mounts two ski attachments or ski carrier 34. Each ski carrier consists of a rigid post 40 which passes diametrically through the cross bar 32 and is held in place by a radial flange 52 on the post and a nut 42 threaded onto the end 44 of the post 40. The free opposite end 44 of the post is bent to a right angle, leaving a straight intermediate length 46.

Each ski attachment 34 also includes a flexible strap 48 which is anchored at one end 50 between the cross bar 32 and the radial flange 52 of the post 40. A pair of holes 56 are punched in the strap 48 near the opposite free end 54 of the strap, as best understood by reference to FIG. 5. The free end 54 is engageable to the post 40 by hooking the perforated strap onto the bent end 44 of the post, as in FIG. 4. When so engaged, the strap 48 forms a semicircular loop to retain a pair of skis S against the post 40.

The ski attachments 34 on each cross bar 32 rotate jointly between an operative, extended position shown in FIG. 5 and a retracted position, seen in FIGS. 4 and 6. In the retracted position, the ski attachments 34 generally are contained in and lie within a plane defined by the cross bars 32 and the parallel arms 14. In the extended position of FIG. 5, the ski attachments extend at a right angle to this plane, and are perpendicular to the parallel arms 14. In this extended position, the posts 40 extend generally in the direction of, i.e. generally parallel with, the supporting arms 20 of the carrier 10 in FIG. 3. The ski carriers 34 are independent of and do not functionally cooperate with the cycle supports 20. The ski carriers 34 are inoperative for supporting the bicycle C in either their extended or retracted positions.

A detent pin 60 is fixed radially to the cross bar 32. The left hand side socket 38 in FIG. 4-6 has two axial slots 62, 64 which are circumferentially spaced by 90 degrees. The detent pin 60 is held in one of the two slots to keep the cross bar 32 from turning in the socket 38. Slot 62 fixes the detent pin 60 so as to lock the ski attachments 34 in the extended position, as shown in FIG. 5. Slot 64 receives the detent pin 60 to lock the ski attachments 34 in the retracted position of FIG. 4. A spring 66 is captive in the other socket 38, at the opposite end of the cross bar on the right hand side in the drawings, and normally urges the cross bar 32 into the opposite socket 38, keeping the detent pin 60 in engagement within one of the slots 62, 64. The ski attachments 34 are moved from one position to another by manually displacing the cross bar 32 against the force of the spring 66 so as to withdraw the detent pin 60 from the slot as indicated by arrow A in FIG. 4, and then turning the cross bar 32 as shown by arrow B in the same figure, to move the ski attachments from their retracted position to the extended position of FIG. 5. The ski attachments are retracted by reversing this process.

While a presently preferred embodiment of the invention has been described and illustrated for purposes of clarity and example, it must be understood that many changes, substitutions and modifications to the described embodiment will become apparent to those possessed of ordinary skill in the art, without thereby departing from the scope and spirit of the invention which is defined by the following claims.

What is claimed is:

1. A combination bicycle/ski carrier, comprising:
   a carrier frame including means for attaching said frame to an automobile:
   first support means for supporting one or more cycles on said frame;
   ski carriers rotatable on said frame independently of said first support means between an extended position and a retracted position, said ski carriers being spaced apart on said frame for supporting between them one or more pairs of skis in said extended position, said ski carriers being inoperative for supporting said cycles in either said extended or retracted position.

2. The improvement of claim 1 wherein each said pair of ski carriers is mounted on one of two tubular supports transverse to said parallel arms, said tubular supports having a longitudinal axis and being mounted to said frame for rotation about said axis.

3. The improvement of claim 2 further comprising detent means for stopping said rotation at said extended and retracted positions.

4. The improvement of claim 3 further comprising spring means normally urging said tubular supports into stopping engagement with said detent means in either of said positions, said tubular supports being disengageable from said detent means for rotation between said positions upon displacement thereof against said spring means.

5. The improvement of claim 1 wherein said ski carriers are generally contained in a plane defined by said parallel arms in said retracted position, and said ski carriers extend generally transversely to said plane in said extended position.

6. The carrier of claim 1 wherein said frame has a lower end and an upper end, and said ski carriers are arranged such that skis supported in said carriers extend longitudinally between said upper end and said lower end of said frame.

7. In a bicycle carrier having a carrier frame including a first U-shaped frame element provided with straps for attachment to an automobile, and a second U-shaped frame element mounted to said first U-shaped frame element for supporting one or more bicycle thereon, the improvement comprising:
a pair of supports mounted between parallel arms of said first U-shaped element, ski carriers on said supports, said supports being rotatable on said first U-shaped element for moving said ski carriers between an extended position for supporting skis on said frame and a retracted position wherein said carriers are removed from interference with bicycles supported on said second U-shaped frame element.

8. The improvement of claim 7 wherein each said ski carrier comprises a rigid support transverse to said tubular segment and a flexible strap attached at one end to said tubular segment and releasably attachable at an opposite end to said rigid support for holding a ski between said strap and said rigid support on said tubular segment.

9. The improvement of claim 7 wherein said supports are straight tubular segments rotatably mounted at opposite ends thereof between parallel arms of said first U-shaped frame element, and detent means for stopping rotation of said supports at said extended and retracted positions.

10. The improvement of claim 9 further comprising spring means normally urging said supports into stopping engagement with said detent means in either of said positions, said supports being disengageable from said detent means for rotation between said positions upon displacement thereof against said spring means.

11. The improvement of claim 9 wherein said ski carriers are generally contained between said parallel arms of the first U-shaped frame element in said retracted position, and said tubular segments rotate approximately 90 degrees from said retracted to said extended positions.

12. The improvement of claim 10 wherein said opposite ends of each tubular segment are each rotatable in a socket mounted to said first U-shaped frame element and said detent means include a pin engageable in one of two slots defined in one said socket, there being a spring captive in another said socket at an opposite end of said tubular segment normally urging said pin into said one of two slots.

13. In a bicycle carrier having a carrier frame including a first U-shaped frame element provided with straps for attachment to an automobile, and a second U-shaped frame element mounted to said first U-shaped frame element for supporting one or more bicycle thereon, the improvement comprising:
a pair of straight tubular segments rotatably mounted at opposite ends thereof between parallel arms of said first U-shaped frame element, ski carriers on said supports, said supports being rotatable on said first U-shaped element for moving said ski carriers between an extended position for supporting skis on said frame and a retracted position wherein said carriers are removed from interference with bicycles supported on said second U-shaped frame element, detent means for stopping rotation of said supports at said extended and retracted positions, and spring means normally urging said supports into stopping engagement with said detent means in either of said positions, said supports being disengageable from said detent means for rotation between said positions upon displacement thereof against said spring means.

14. The improvement of claim 13 wherein said ski carriers are generally contained between said parallel arms of the first U-shaped frame element in said retracted position, and said tubular segments rotate approximately 90 degrees from said retracted to said extended positions.

15. The improvement of claim 13 wherein each said ski carrier comprises a rigid support transverse to said tubular segment and a flexible strap attached at one end to said tubular segment and releasably attachable at an opposite end to said rigid support for holding a ski between said strap and said rigid support on said tubular segment.

16. In a bicycle carrier having a carrier frame including a first U-shaped frame element provided with straps for attachment to an automobile, and a second U-shaped frame element mounted to said first U-shaped frame element for supporting one or more bicycle thereon, the improvement comprising:
a pair of straight tubular segments rotatably mounted at opposite ends thereof between parallel arms of said first U-shaped frame element, ski carriers on said supports, said supports being rotatable on said first U-shaped element for moving said ski carriers between an extended position for supporting skis on said frame and a retracted position wherein said carriers are removed from interference with bicycles supported on said second U-shaped frame element, detent means for stopping rotation of said supports at said extended and retracted positions, and spring means normally urging said supports into stopping engagement with said detent means in either of said positions, said supports being disengageable from said detent means for rotation through approximately 90 degrees between said positions upon displacement thereof against said spring means, each said ski carrier comprising a rigid support transverse to said tubular segment and a flexible strap attached at one end to said tubular segment and releasably attachable at an opposite end to said rigid support for holding a ski between said strap and said rigid support on said tubular segment, said ski carriers being generally contained in a plane defined between said parallel arms of the first U-shaped frame element in said retracted position.

17. The improvement of claim 16 wherein said opposite ends of each tubular segment are each rotatable in a socket mounted to said parallel arms of the first U-shaped frame element.

18. The improvement of claim 17 wherein said detent means for each said tubular segment include a pin engageable in one of two slots defined in one said socket, there being a spring captive in another said socket at an opposite end of said tubular segment normally urging said pin into said one of two slots.

19. A combination bicycle/ski carrier, comprising:

a carrier frame including a pair of parallel arms extending between an upper end and a lower end of said frame, and means for attaching said frame to an automobile, first support means for supporting one or more cycles on said frame;

ski carriers rotatable independently of said first support means on said frame between an extended operative position and a retracted position wherein the ski carriers are substantially contained in a common plane with said parallel arms, said ski carriers being spaced apart on said frame for supporting between them skis in said extended position such that the skis are generally parallel with said parallel arms.

20. The carrier of claim 19 wherein said ski carriers compare ski carrier pairs, each pair mounted for joint rotation on corresponding rotatable elements.

* * * * *